May 19, 1931.  R. H. WHITE  1,805,536
STEERING MECHANISM
Filed Sept. 27, 1928  3 Sheets-Sheet 1

INVENTOR.
ROLLIN H. WHITE
BY
Wayne M. Hart
ATTORNEY.

May 19, 1931.　　　R. H. WHITE　　　1,805,536
STEERING MECHANISM
Filed Sept. 27, 1928　　　3 Sheets-Sheet 2
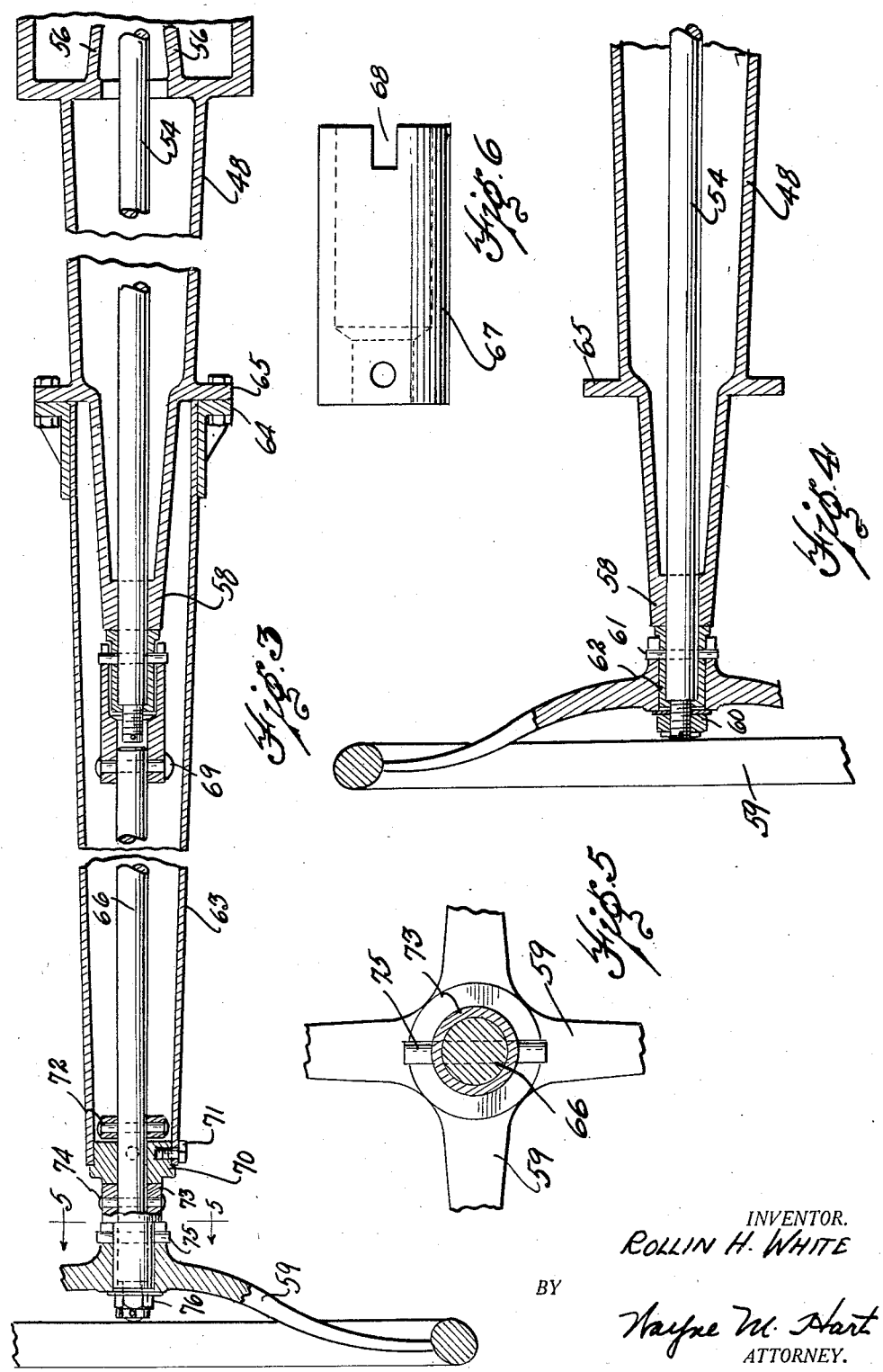
INVENTOR.
ROLLIN H. WHITE
BY
Wayne M. Hart
ATTORNEY.

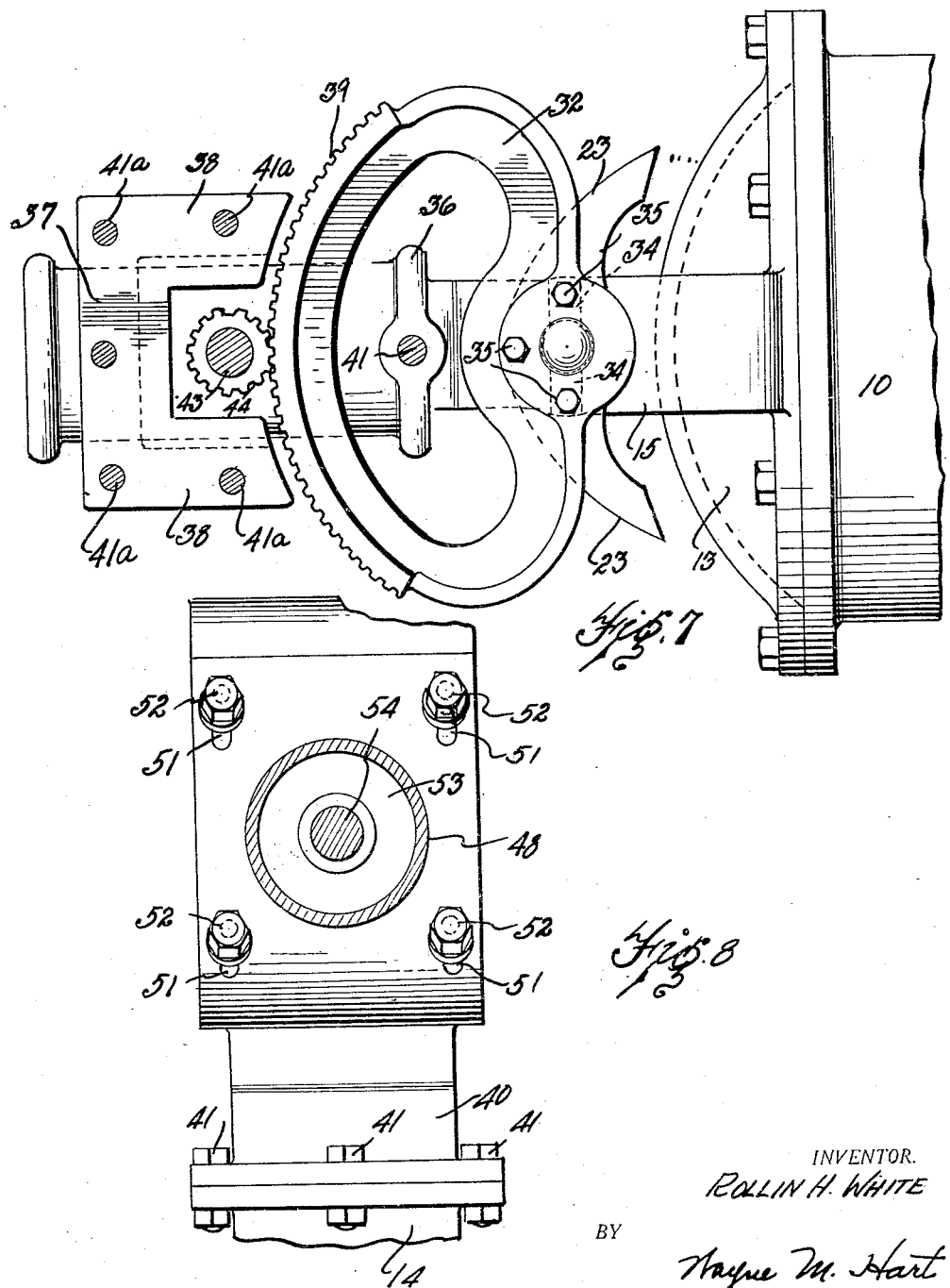

Patented May 19, 1931

1,805,536

UNITED STATES PATENT OFFICE

ROLLIN H. WHITE, OF CLEVELAND HEIGHTS, OHIO

STEERING MECHANISM

Original application filed September 21, 1927, Serial No. 220,895. Divided and this application filed September 27, 1928. Serial No. 308,774.

This invention relates to tractors, and more particularly to tractor steering mechanism, this application being a division of my co-pending application Serial No. 220,895, filed September 21, 1927.

An object of the invention resides in steering mechanism for tractors which can be readily arranged to extend within convenient reach of the operator for his manipulation when seated in different positions provided upon the various vehicles and implements adapted to be drawn by the tractor.

Another object of my invention resides in a novel form of steering mechanism and mounting therefor which lends itself particularly to association with a tractor supported upon and propelled by a single mechanism on each side of the main frame so that upon manual manipulation the tractor will travel in the desired direction.

A further object of my invention resides in steering mechanism for tractors which is formed in units which can be removed from or attached to a tractor either bodily, as a complete structure, or in sections.

These and other objects more or less ancillary or incidental to the foregoing will appear from the following description in connection with the drawings:

In the drawings, Fig. 1 is a side elevation of a cultivator drawn by a tractor with which my invention is associated;

Fig. 3 is a longitudinal sectional view of an extended steering column and shaft taken on line 3—3 of Fig. 1;

Fig. 4 is a similar view of the same with one section of the steering column and shaft removed;

Fig. 5 is a sectional view taken on line 5—5 of Fig. 3;

Fig. 6 is an elevation of the coupling for connecting adjacent ends of the steering shaft sections;

Fig. 7 is a fragmentary horizontal sectional view of the steering mechanism taken on line 7—7 of Fig. 2; and Fig. 8 is an enlarged sectional view of the steering mechanism taken on line 8—8 of Fig. 2.

Figure 1:
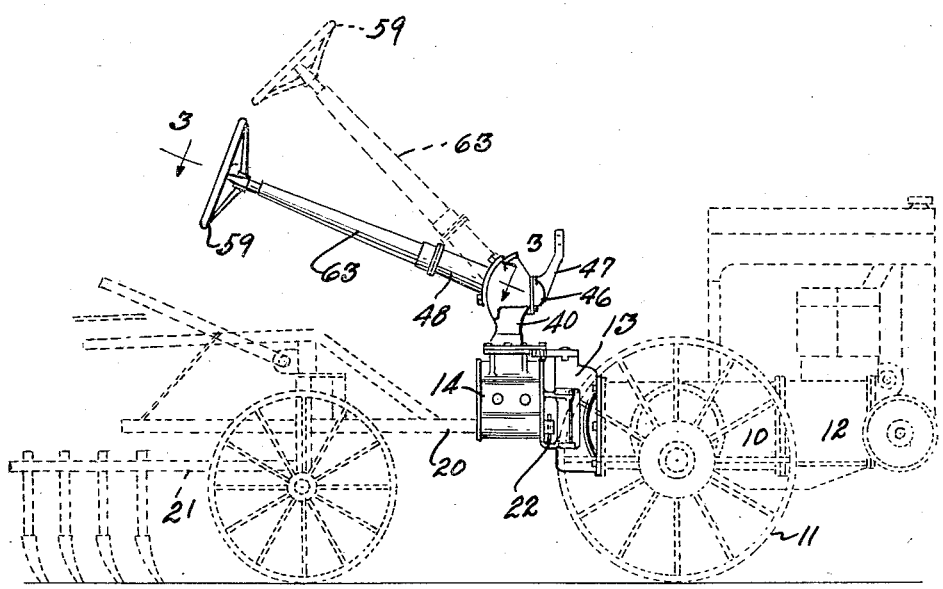
Figure 2:
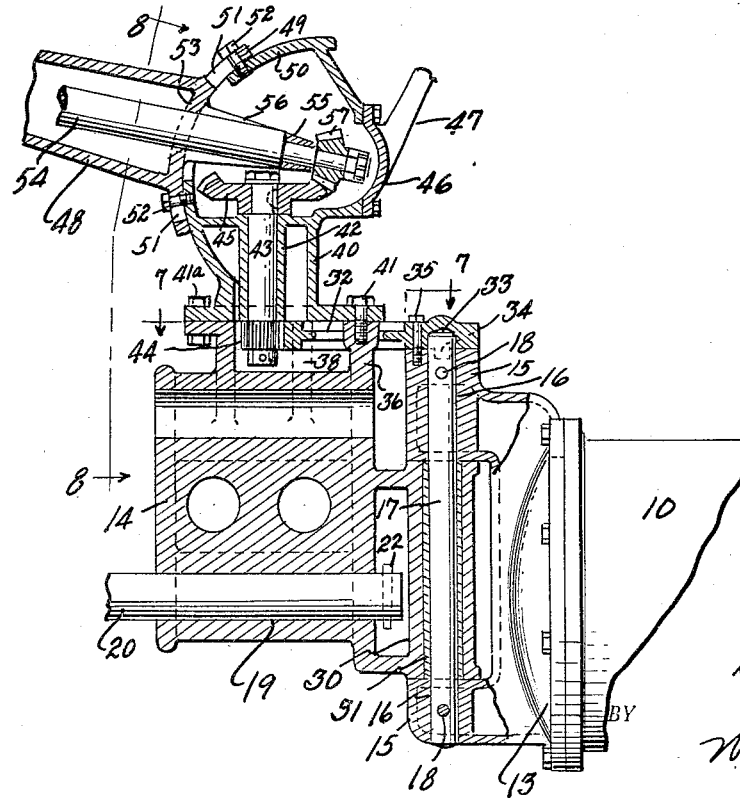
Fig. 2 is a longitudinal sectional view of the steering mechanism mounted upon the coupling and the rear end of the tractor.

Referring now to the drawings by characters of reference, 10 illustrates the transmission casing of a tractor with which is associated a pair of traction wheels 11 located one on each side thereof, such wheels providing the sole means for driving and supporting the tractor. An engine casing 12 is secured to the front end of the transmission casing and a cover casing 13 is secured to the rear end of the transmission, the casings 10, 12 and 13 are secured rigidly together and provide the main frame of the tractor.

The rear cover casing 13 is arranged to carry a coupling member 14, to which implements or vehicles are attached, and also, to carry the entire steering mechanism. The rear cover casing is formed with vertically spaced arms 15, each of which is provided with a vertical opening 16 to receive a pintle 17. The pintle is secured in such vertically aligned openings by the pins 18 which extend horizontally through openings in the arms and the pintle. The main body of the coupling member is provided with vertically spaced longitudinally extending apertures 19 for the reception of the draw bar 20 of the cultivator 21, the draw bar being secured in such apertures by the removable key 22. The forward portion of the coupling member is formed as a boss 30 having a vertical aperture therethrough in which the bushing 31 is pressed, and such boss is arranged to fit intermediate the arms 15 so that the pin 17 will pass through the bushing and thus provide a swivel connection between the coupling and the rear cover casing.

The steering mechanism is carried upon the top of the coupling member and the upper arm 15. A rack 32, arcuate in form, is secured at its hub portion upon the upper arm 15 and is provided with a recess 33 into which the upper end of the pin 17 extends. The hub portion of the rack is provided with a pair of depending lugs 34 which are arranged to fit into slots formed in the upper wall of the arm 15, such relation of the lugs in the slots serving to prevent rotation of the rack. A stud 35 extends through an aperture in the rack and is screwed into an aperture in the upper arm 15 of the rear casing, thus fixing the rack stationarily with the tractor frame.

The upper portion of the coupling member is formed with a forward upwardly extending flange or wall 36 which projects through the open central portion of the rack segment, and connected rear and side walls 37 and 38 extend upwardly from the coupling member in rearwardly spaced relation from the wall 36. The walls provide a casing having open sides for the arcuate portion of the rack which is formed with gear teeth 39. It will be seen that the rack is stationarily fixed to the tractor, while the coupling member is free to swivel in a horizontal plane on the vertical pin 17.

A supporting casing 40 is secured upon the upper end of the walls 36, 37 and 38 and is secured thereover by the stud 41 and the bolts 41ª. The supporting member is provided with a vertically extending bearing hub 42 which receives the shaft 43. The lower end of the shaft extends beneath the bearing and has a gear 44 fixed thereto, which gear meshes with the teeth of the rack. The upper end of the shaft extends above the bearing and a bevel gear 45 is fixed thereto.

It will be seen that the coupling member is a unitary structure which can be readily fixed or removed from the rear casing through application or removal of the pin 17. It will also be seen that the rack can be readily associated with or removed from fixed position on the cover, and further, that the support 40 and gears and shaft carried thereby are associated as a unitary structure which can be readily fixed to or removed from the coupling member.

By rotating the shaft 43 in either direction the gear 44, meshing with the teeth on the fixed rack, will cause the rack to move either to the right or left relative to the coupling member, and as the tractor is fixed rigidly with the rack, it will be moved therewith in an angular relation in a horizontal plane. In this manner the tractor can be bodily turned manually for steering as it is supported and propelled by a pair of wheels. In order to limit the turning movement of the tractor effected by the steering mechanism the boss 30 is provided with a pair of arms, or stop members 23 which engage against the casing 13 upon a limited turning movement.

Mechanism for rotating the gear 45 is carried by the support 40, such mechanism being assembled as a unitary structure which can be bodily positioned or removed as such. In addition, I have constructed this mechanism in sections to provide different lengths, and also, to permit vertical adjustment as a unit so that manipulation by an operator can be conveniently had from different positions determined by his location on the different tools or vehicles which are drawn by the tractor.

The upper end of the support 40 is formed as a casing which is provided with an aperture closed by a removable plate 46 from which an arm 47 extends for transmission control lines. A hollow column 48 is provided with an arcuate flange 49 which is adapted to engage a similarly shaped rear wall 50 of the support casing. The flange 49 is provided with slots 51, and studs 52 extend through such slots and are screwed into apertures in the arcuate wall of the support casing until they clamp the flange against the arcuate wall in desired relation. By loosening the studs the column is free to be adjusted in a vertical plane, thus permitting desired vertical adjustment thereof. The column is provided at its base with a wall 53 having an aperture therethrough to receive a shaft 54. In addition a bearing 55, formed by arms 56 extending from the column, carries the end of the shaft 54. A bevel gear 57 is secured to the end of the shaft 54 extending beyond the bearing 55 and is positioned to mesh with the gear 45 in any position in which the column and the shaft carried thereby may be adjusted vertically. In order to provide such a meshing relation the gear 45 is provided with teeth the pitch of which extends relatively in two angular planes, so that when the shaft is in its upper position the gear 57 will mesh with the lower portion of the angular teeth on the gear 45, and when in its lower position will mesh with the upper portion of the angular teeth. It will thus be seen that the vertical adjustment of the column and shaft can be made without disconnecting the driving connection between the gears 57 and 45.

The rear end 58 of the column 48 is formed to provide a bearing through which the shaft 54 extends and projects beyond. A hand wheel 59 is secured against endwise displacement from the projecting end of the shaft 54 by the nut 60 and the ends of a pin 61 which extends through the bearing 62 engages in slots in the wheel hub to prevent rotation thereof on the shaft.

The steering mechanism heretofore described is employed when the operator is located close to the tractor on an implement or vehicle being pulled thereby, but when the operator is located distantly I provide an extension which can be readily associated with the mechanism described. In such event, when the nut 60 is removed from the end of the shaft the hand wheel can be removed from the shaft 54, and another column and shaft section are then associated with the column 48 and the shaft 54. The hollow column extension 63 is provided at its base with a flange 64 which is bolted to a flange 65 extending from the column 48 for this purpose. A shaft extension 66 extends into the column extension and is secured to the end of the shaft 54 by a coupling member 67. One end of the coupling member fits over the bushing 62 and is provided with slots 68 which receive the projecting ends of the pin 61, while the other end of the coupling member fits over the end of the shaft 63 and is riveted thereto by the member 69. It will be seen that the coupling member secures the shaft ends rigidly together, and can be readily slipped over or from the end of the shaft 54.

An end closure member 70 is secured to the rear end of the column extension by studs 71. The shaft extension projects through the closure member and a stop pin 72 is associated with the shaft on the inner side of the end closure to prevent axial displacement of the shaft extension and coupling member. A bearing member 73 encircles the projecting end of the shaft and is arranged adjacent the outer end of the closure member, a pin 74 extending through the bearing and shaft. The hub of the hand wheel 59 is then pushed on the bushing so that the ends of the pin 75 enter in the slots in the hub portion thereof, and a nut 76 is screwed on the threaded end of the shaft extension against the hand wheel hub. It will be seen that the shaft and column and the shaft extension and column extension can be readily associated or disconnected to provide a short or long operating mechanism for the steering gearing.

The entire mechanism lends itself to unitary sectional assembly which can be readily associated or disconnected so that manufacture and service are facilitated thus minimizing the cost of both. The operating mechanism can be adjusted vertically, and can be lengthened or shortened, thus facilitating its use from the operator's seat on a variety of implements and vehicles. In addition, the steering gear is a compact, efficient mechanism to which the tractor will readily respond without unusual manual effort by the operator.

Various changes can be made in the structure described without departing from the spirit of the invention or the scope of what is claimed.

What I claim is:

1. In a tractor having a main frame and a coupling swivelled thereto, steering mechanism for moving said tractor laterally relative to said coupling comprising a rack fixed to said main frame, gearing associated with said rack and carried by said coupling, a manually operable shaft, for actuating said gearing, and a column for supporting said shaft, said column, shaft and shaft gear being detachably associated as a unitary structure with the remainder of said steering mechanism.

2. In a two wheel tractor, a rear transmission cover having an integral yoke extending therefrom, a rack secured to the yoke, a coupling member pivotally carried by the yoke, a housing on the coupling, a vertically extending shaft in the housing, an upper gear fixed on the shaft, a lower gear fixed on the shaft and meshing with the rack, a rotatable steering shaft carried by the housing, and a gear fixed on the steering shaft and meshing with the upper gear.

3. In a two wheel tractor, a transmission casing, an arcuate rack fixed to the casing, a coupling pivoted to the casing, a housing carried by the coupling, a vertical shaft mounted in the housing, a lower gear fixed on the shaft and meshing with the rack, an upper gear fixed on the shaft, a rotatable steering shaft, and a gear fixed on the steering shaft and meshing with the upper gear.

In testimony whereof I hereunto affix my signature.

ROLLIN H. WHITE.